UNITED STATES PATENT OFFICE 2,553,996

PLASTICIZATION OF VINYL CHLORIDE POLYMERS

Leslie Stephen Abbott, Banstead, England, assignor to The Distillers Company Limited, Edinburgh, Scotland, a British company No Drawing. Application April 18, 1950, Serial No. 156,721. In Great Britain April 29, 1949

10 Claims. (Cl. 260—31.6)

According to this invention thermoplastic polymeric materials comprising a major proportion of vinyl chloride units are plasticised by diesters of fatty acids having 3–9 carbon atoms in the molecule with vinyl or ethyl cyclohexan-3:4-diol, the total number of carbon atoms in the two combined acid residues being 8–16.

The above mentioned esters are new compounds and may be prepared as set forth in my copending application Serial No. 156,722, filed April 18, 1950. The diesters of vinyl cyclohexan-3:4-diol may be prepared by the step of reacting vinyl cyclohexen-3:4 with about 1 molar proportion of a peracid selected from the group consisting of performic and peracetic acid, dissolved in the corresponding carboxylic acid, at a temperature of 35–95° C., in the presence of a catalytic amount of sulphuric acid, the step of hydrolysing the monoester so produced, and the step of thereafter esterifying the resultant diol. The corresponding diesters of ethyl cyclohexan-3:4-diol may be prepared by the process described above incorporating an additional hydrogenation step at any stage after the first of said steps.

For example, 1-vinylcyclohexan-3:4-di-n-octanoate and 1-ethylcyclohexan-3:4-di-n-octanoate may be prepared as follows:

*1-vinylcyclohexan-3:4-di-n-octanoate*

A mixture of 28.5 ml. of 100-volume hydrogen peroxide and 90 ml. of glacial acetic acid was heated to 80° C. for 1 hour and 0.4 gram of tungsten trioxide was dissolved therein. The solution, containing the equivalent of 241.6 millimols of peroxidic oxygen, was stirred at 70° C. with 21.6 grams (200 millimols) of vinylcyclohexene-3. The peroxide was substantially consumed after 5 hours when analysis showed the presence in the product of 31.4 millimols of unchanged vinylcyclohexene together with 151.8 milli-equivalents of glycol by per-iodate titration, corresponding to a yield of 21.6 grams or 90% on the vinylcyclohexene consumed. The bulk of the product, after evaporating some of the water and acetic acid under reduced pressure, was boiled for 1 hour with an excess of aqueous caustic soda and the solution was then saturated with potassium carbonate which caused the precipitation of the free vinyl cyclohexen-3:4-diol as an oil.

14.2 grams of vinylcyclohexane-3:4-diol were mixed with 80 grams of pyridine and 32.6 grams of caprylyl chloride were added slowly at below 40° C. The mixture was maintained at 40° to 50° C. for 1 hour, filtered, ether was added to the filtrate, and this was filtered in turn. The precipitates were washed with ether and the combined washings and the main ether fractions were combined, washed with dilute hydrochloric acid to remove pyridine, neutralized, washed and dried. On stripping under reduced pressure and distillation, 28 grams of the mobile dioctanoate were obtained, boiling point under 0.5 mm. Hg 172° to 176° C., $n_D^{20}$ 1.4610.

*1-ethylcyclohexan-3:4-di-n-octanoate*

14.2 grams of vinylcyclohexane-3:4-diol were mixed with 70 ml. of ethanol and 1 gram of palladium-on-chalk catalyst in a 2-necked reaction flask and shaken with hydrogen under substantially atmospheric pressure. 2180 ml. of hydrogen were absorbed and the resulting ethylcyclohexane-3:4-diol was isolated in 83.3% yield (12 grams) as a liquid boiling under 1–2 mm. Hg at 107° to 108° C., $n_D^{20}$ 1.4845.

The 12 grams of ethylcyclohexane-3:4-diol were esterified with 33.5 grams of caprylyl chloride in pyridine at 40° C. for 1 hour. After removing the pyridine by acid washing followed by neutralisation, washing and drying, the product was distilled to give 22.7 grams (57.2%) yield of the fairly mobile ethylcyclohexan-3:4-di-n-octanoate, boiling under 1 mm. Hg at 186 to 188° C., $n_D^{20}$ 1.4558.

It is preferred that the two acid residues should be the same, but mixed esters such as the monopropionate mono-nonanoate or the mono-propionate mono-caprylate may be employed if desired.

The following examples illustrate two particular embodiment of this invention, the parts referred to being by weight.

EXAMPLE 1

A mixture of 200 parts of polyvinyl chloride, 100 parts of 1-ethylcyclohexan-3:4-di-n-octanoate, 14 parts of white lead and 0.25 part of stearic acid was milled for 5 minutes on a hot-roller mill at 140° C. The mixture rapidly became homogeneous, and no volatilisation of the plasticiser took place. The resulting compound was then taken off the mill in the form of a thin sheet and samples were cut from this and pressed between polished platens for 5 minutes at 150° C. to give uniform sheets about 0.04 inch thick. Standard tensile test specimens were cut from this sheet, and tensile strength and elongation determinations were made with the following results:

Average breaking stress: 3320 lbs./sq. in.
Average elongation at break: 396%.

EXAMPLE 2

The procedure of Example 1 was followed precisely, except that the plasticiser used was 1-vinyl-cyclohexan-3:4-di-n-octanoate. The results of the tensile strength and elongation determinations were:

Average breaking stress: 3340 lbs./sq. in.
Average elongation at break: 397%.

By way of comparison, a composition was prepared as described in the previous example but using di-(2-ethylhexyl) phthalate as plasticiser. The results of the tensile strength and elongation determinations were then:

Average breaking stress: 3100 lbs./sq. in.
Average elongation at break: 410%.

Thus, this composition has a lower tensile strength and suffers a greater elongation under tension than those described in Examples 1 and 2 above.

Other esters which may be used according to this invention, and as described in Examples 1 and 2, include the following derivatives of vinyl-cyclohexan-3:4-diol, and the corresponding hydrogenated compounds:

Dibutyrate, B. Pt. at 1 mm. Hg 140–145° C., $n_D^{20}$ 1.468
Diheptanoate, B. Pt. at 2 mm. Hg 190° C., $n_D^{20}$ 1.460
Bis 2-ethyl-hexanoate, B. Pt. at 1–2 mm. Hg 165–175° C. $n_D^{20}$ 1.461
Bis 2:4-trimethyl pentanoate B. Pt. at 1 mm. Hg 165–170° C. $n_D^{20}$ 1.459.
Monononanoate monopropionate The above diesters may be made by the process in accordance with the above examples. The mixed ester may be prepared by a two-stage esterification of the diol.

Also, other thermoplasts may be employed in place of polyvinyl chloride if they contain a major proportion of vinyl chloride units, suitable materials being copolymers of vinyl chloride with vinylidene chloride, with vinyl esters such as vinyl acetate, or with acrylates and methacrylates such as ethyl acrylate, and including copolymers containing more than two kinds of monomeric unit, for example vinyl chloride, vinylidene chloride and acrylonitrile. The amounts of the novel plasticisers which may be incorporated in the vinyl chloride polymers and copolymers according to this invention are not critical and are those usual in the art for ester type plasticisers, generally 5–60% by weight of the composition with the preferred range 30–50%, due regard being had for compatability in individual cases when large quantities are employed. In particular, useful compositions may be prepared from commercial vinyl-chloride-vinylidene chloride copolymers containing about 8–18% of the latter and sold under the trade name "Geon," with the above-mentioned amounts of the novel plasticisers, using standard compounding procedures.

I claim:

1. A thermoplastic polymeric material having a major proportion of vinyl chloride units in the molecule, plasticised with an aliphatic diester of a diol selected from the group consisting of vinyl cyclohexan-3:4-diol and ethyl cyclohexan-3:4-diol, wherein each fatty acid residue has 3–9 carbon atoms, and the total number of carbon atoms in the two acid residues is 8–16.

2. A plasticised thermoplastic composition as set forth in claim 1, wherein said residues are of the same fatty acid.

3. A plasticised thermoplastic composition as set forth in claim 2, wherein said fatty acid is normal octanoic acid.

4. A plasticised thermoplastic composition comprising polyvinyl chloride and a diester of vinyl cyclohexan-3:4-diol with a fatty acid of 4–8 carbon atoms.

5. A plasticised thermoplastic composition comprising polyvinyl chloride and a diester of ethyl cyclohexan-3:4-diol with a fatty acid of 4–8 carbon atoms.

6. A plasticised thermoplastic composition comprising polyvinyl chloride and vinyl cyclohexan-3:4-dibutyrate.

7. A plasticised thermoplastic composition comprising polyvinyl chloride and vinyl cyclohexan-3:4-dioctanoate.

8. A plasticised thermoplastic composition comprising polyvinyl chloride and vinyl cyclohexan-3:4-bis 2-ethyl hexanoate.

9. A plasticised thermoplastic composition comprising polyvinyl chloride and ethyl cyclohexan-3:4-dibutyrate.

10. A plasticised thermoplastic composition comprising polyvinyl chloride and ethyl cyclohexan-3:4-di-octanoate.

LESLIE STEPHEN ABBOTT.

No references cited.